United States Patent Office 3,033,801
Patented May 8, 1962

3,033,801
PROCESS OF FORMING SOLID CAKES AND PELLETS FROM METAL OXIDE AEROGELS
Harry Kloepfer, Frankfurt am Main, Germany, assignor to Deutsche Gold- und Silber-Scheideanstalt vormals Roessler, Frankfurt am Main, Germany, a corporation of Germany
No Drawing. Filed Feb. 6, 1958, Ser. No. 713,526
2 Claims. (Cl. 252—459)

This invention relates to the formation of pellets or other solid shapes suitable for use as catalysts or catalyst carriers from finely-divided metal oxide aerogel partciles. For the purposes of this application the term "metal" is used herein to include the metalloid silicon which is fully equivalent to a metal in the process of this invention.

Process for obtaining oxides as aerogels in very finely divided form by thermal decomposition, oxidation or hydrolysis of appropriate metal salts are well known in the art. These finely divided materials find manifold application, for example as active fillers for natural and synthetic rubbers and synthetic materials of all kinds. For certain purposes, such as those known for silica gels obtained by wet processes, it is desirable to convert these aerogels into pellets or other solid objects of suitable shape.

The manner in which the metal oxide aerogel is formed is not a part of this invention. Known processes are available. For example, United States Patent No. 2,333,948, Muskat, discloses a satisfactory process of producing finely divided metal oxides in aerogel form from metals of the group consisting of chromium, silicon, aluminum, zinc, cadmium, nickel, and others, by reacting a vaporized halide of a metal of this group, such as silicium tetrachloride, titanium tetrachloride, aluminum chloride, etc., with oxygen while maintaining the halide out of substantial contact with the hot surfaces of the reaction chamber. Such oxides, recovered as aerogels, may now be converted to pellets or other solid shapes in accordance with the process of the present invention.

It has now surprisingly been found that aerogels of these metals, when mixed into a paste with liquids, in particular water, shaped and then dried, yield solid objects of considerable cohesive strength. The drying itself may be effected in suitably designed molds, or a solid mass may be dried and subsequently reduced to the desired granulation. There was no known basis for predicting that drying, or evaporation of the added liquid, in particular water, would not lead to a decomposition or breaking down of the objects. However, by this simple process, it has been found that aerogels may be converted into any desired form or object, for example into cakes for crushing or into pellets, briquettes etc. Not only chemically homogeneous aerogels, but mixtures of various oxides obtained in aerogel form may be used. Similarly, foreign substances not in aerogel form may be added. Instead of water, other aqueous solutions may be used to make the paste, for example salt solutions and the like, or aqueous solvents. According to a preferred embodiment of the invention, pellets are fabricated from silica aerogel obtained by hydrolysis of silicon halides, advantageously silicon tetrachloride or silico-chloroform, under the action of heat, preferably in a flame. In like manner, aerogels of other oxides, in particular aluminum oxide, as well as titanium oxide, zirconium oxide etc., can be formed into pellets. In the preparation of the aerogels, instead of hydrolysis under the action of heat, an oxidation, for example in a carbon monoxide flame, or a thermal decomposition, as for aluminum sulfate, may be used.

According to one illustrative example of the invention, the aerogel is mixed with water to a viscous paste or slurry which may or may not be coagulated by addition of a coagulant (electrolyte). The proportion of water used in relation to the oxide may be varied between 2 and 12, parts, preferably 3 and 7 parts of water to one part of oxide, according to the desired consistency of the paste. There is naturally some dependence upon the chemical nature and the particle size of the oxide used.

The following is an example:

1 part of silica (aerogel), which has been prepared by reacting silicon tetrachloride with oxygen, is mixed to form a paste with 10 parts of water containing 0.01 part of $Ni^{++}$ in solution. This paste is then filled into a vessel and dried either under vacuo at temperatures below 100° C. or in a drying oven at temperatures of 110° or 160° C. The thus formed cake is then crushed into the desired particle size. The fraction 4.2–5.4 mm. has a bulk-weight of 350 grs. per liter. At first the single particles float on the water surface but sink under after a short time owing to the capillary action of the pores.

In place of silicon oxide (silica aerogel) used in the above example, aerogels of aluminum oxide, titanium oxide, etc., as above set forth, may be substituted.

Alternatively the paste or slurry may be introduced dropwise into an organic liquid, for example petroleum, heated to about 80° C. Under the action of heat, there will be a very prompt coagulation of the viscous aerogel paste, with formation of discrete pellets. The pellets produced are removed from the coagulation vessel and then dried.

In practice temperatures of 100 to 200° C. of dry heat may be applied to obtain a quicker evaporation of the water. At higher temperatures, for instance, at temperatures up to 600° C. the mechanical strength of the shaped object increases. The structure of the shaped objects is also slightly changed.

*Example.*—Particles of the same granular form and composition, dried (a) at 160° C., (b) at temperatures up to 600° C., thrown together into water, show the following changes: the particles dried at temperatures of 160° C. become bluish glassy after a short time, while the particles dried at 600° C. only gradually absorb water in such a quantity that they change into a state of semitransparency. The catalytic effect for the reactions (as mentioned below) is however independent of the drying temperature. The finely divided oxides can also be characterized by particle size, as for instance, particles below 150 m/$\mu$, preferably below 50 m/$\mu$ diameter.

Pellets produced according to the invention may be used to advantage as catalysts or as catalyst carriers. In particular, it has been found that pellets formed of aerogel silica or aluminum oxide have catalytic properties substantially superior to those of otherwise similar products obtained by wet processes.

Extensive experiments have shown that the formed catalysts produced according to this invention are unexpectedly advantageous for continuous use under a wide variety of conditions, without losing their activity or disintegrating. Thus, for example, a catalyst comprising a silica aerogel will retain its integrity and shape at elevated temperatures, whether in the gaseous or in the liquid phase. For incorporation of catalytically active substances such as copper oxide, chromium oxide, metallic platinum etc., the finely divided oxides may be mixed into a viscous paste with an aqueous solution of the substance to be incorporated. In some cases, for incorporating larger proportions of catalytically effective substances, small amounts of binders may be added to the water to secure additional solidity. Alternatively, the objects formed may be subsequently charged or impregnated in known manner with the desired catalytically active compounds or metals.

Good results may for example be obtained with catalysts prepared according to the invention in hydrogenation, oxidation, and polymerization or condensation. For example, such catalysts impregnated with noble metals have been found suitable for the so-called platforming process, in which both a cracking and a hydrogenation of higher hydrocarbons are effected simultaneously.

In addition to their catalytic properties, objects formed according to the invention also possess substantial adsorption capacity, likewise susceptible of manifold application. In the use of the aerogels, e.g. as active fillers for rubber, synthetic resin etc., it is found advantageous to use small, solid, self-sustaining objects such as pellets, granules or the like, formed according to the invention, instead of fine powder.

Suitable mixtures of oxide-aerogel are especially mixtures of silica-aluminum oxide which can be impregnated as shaped objects in any desired way. It is, of course, possible to add finely divided material as aerogels which can easily be incorporated by impregnation. The physical properties of the shaped objects have already been explained in part. As it is very difficult to define their cohesive strength, an exact value in this respect cannot be stated. It is, however, possible to fill columns with a height of ½ m. and more with the shaped objects according to the invention without destroying the single particles. The particle size depends on the production as well as on the degree of crushing. The porosity, which has already been discussed, can be determined if a density of about 0.5 to 0.7 is taken as a basis. According to the kind of production, the porosity may vary in a wide range.

The impregnation with precious metals can be carried out in the same way as shown in the aforementioned example for nickel. For such an impregnation, however, solutions of $H_2PtCl_6$ or other suitable solutions may be used. The finished shaped object can also be put into a solution of $H_2PtCl_6$ in order to absorb this solution. It is also possible to mix, for instance, silica aluminum oxide with oxalate of silver and silver oxide, to form a paste and to heat the thus produced shaped objects after the drying process to the decomposition temperature of the silver compound.

The following examples show the use of the shaped objects as catalyzers produced according to this invention:

(1) A shaped object (produced as mentioned in the example given) of the particle size of 3–4 mm. with 10% $Ni^{++}$ is reduced in the hydrogen stream to nickel and is used as a catalyzer for the reaction $$CO+3H_2=CH_4+H_2O$$

at temperatures of about 500° C. with a yield of 57.5%.

(2) A catalyzer (produced as mentioned in Example 1) with 1% nickel is used for the reaction $$C_2H_4+H_2=C_2H_6$$

at temperatures of about 500° C. with a yield of 99.2%.

(3) A catalyzer consisting of 98% silica and 2% aluminum oxide is used for the reaction $$C_2H_5OH=H_2O+C_2H_4$$

at temperatures of about 400° with a yield of 99.2%.

(4) A catalyzer consisting of 98% silica and 2% cerous carbonate is used for the reaction $$2CH_3COOH_3=CH_3COCH_3+CO+H_2O$$

with a yield of 90%.

(5) A catalyzer obtained from pure titanic oxide in a pyrogenic process (by hydrolysis at 1100° C.) catalyzes the formation of acetic acid esters at 250° C. with a yield of 75%. With the commercial "Titandioxyd Kronos" only a yield of 53.3% may be obtained.

This application is a continuation-in-part of my copending application Serial No. 402,599, filed January 6, 1954, now abandoned.

Having thus disclosed my invention and described in detail preferred embodiments thereof, I claim and desire to secure by Letters Patent:

1. The process for producing solid pellets or cakes for use as catalysts from metal oxide aerogels, which consists in mixing a dehydrated oxide, selected from the group consisting of the oxides of chromium, silicon, aluminum, zinc, cadmium and nickel, prepared by reacting with oxygen a vaporized halide of an element of this group, with sufficient aqueous solution to form a viscous, binder-free paste, shaping the paste into solid objects selected from the group consisting of cakes and pellets, and then removing liquid therefrom thus producing objects of a density of 0.5 to 0.7 of high catalytic effect, stable at the high temperature of catalytic reaction, and of a cohesive strength sufficient to maintain their shape and integrity against disintegration when placed in column formation approximately one-half meter in height.

2. The solid discrete pellets and cakes produced by the process of claim 1.

References Cited in the file of this patent
UNITED STATES PATENTS

| | | |
|---|---|---|
| 1,266,782 | Ellis | May 21, 1918 |
| 1,925,820 | Reyerson | Sept. 5, 1933 |
| 2,408,215 | Keating | Sept. 24, 1946 |
| 2,471,000 | Messenger | May 24, 1949 |
| 2,680,099 | Hoekstra | June 1, 1954 |